United States Patent [19]
McConnell et al.

[11] Patent Number: 5,763,770
[45] Date of Patent: Jun. 9, 1998

[54] DESIGN OF GOLF CLUBS WITH NODE LINE MAPPING

[75] Inventors: Kenneth G. McConnell, Ames; Paul C. Johnson, Spirit Lake, both of Iowa

[73] Assignee: Berkley Inc., Spirit Lake, Iowa

[21] Appl. No.: 592,698

[22] Filed: Jan. 26, 1996

Related U.S. Application Data

[63] Continuation-in-part of Ser. No. 578,167, Dec. 29, 1995, Pat. No. 5,703,294.

[51] Int. Cl.$^6$ .................................................. A63B 53/00
[52] U.S. Cl. .................... 73/65.03; 73/12.04; 473/289
[58] Field of Search .................................. 473/349, 289, 473/318, 291, 344, 290, 296, 305, 316, 332, 333; 73/65.03, 65.01, 12.04

[56] References Cited

U.S. PATENT DOCUMENTS

| | | |
|---|---|---|
| 3,998,458 | 12/1976 | Inoue et al. . |
| 4,165,071 | 8/1979 | Frolow . |
| 4,291,574 | 9/1981 | Frolow . |
| 4,736,949 | 4/1988 | Muroi . |
| 4,870,868 | 10/1989 | Gastgeb et al. . |
| 4,979,743 | 12/1990 | Sears . |
| 5,351,953 | 10/1994 | Mase . |
| 5,513,844 | 5/1996 | Ashcraft ............................ 73/65.03 |

OTHER PUBLICATIONS

Article—"Using Modal Analysis to Evaluate Golf Club Performance" by Paulo S. Varoto and Kenneth G. McConnell, Iowa State University of Science and Technology, Ames, Iowa, Mar. 1995.

Article—Modality Synchronization: The Future of Graphite Golf Shafts? Get you clubheads and graphite shafts in harmony, by Tom Dellner, Petersen's Golfing Jan. 1996, pp. 64–65.

*Primary Examiner*—Christine K. Oda
*Attorney, Agent, or Firm*—Banner & Witcoff

[57] ABSTRACT

Vibrational analysis is used to map the true sweet spot of a golf club. The testing device, method of testing, method of designing a golf club, and tuned golf clubs are disclosed.

7 Claims, 5 Drawing Sheets

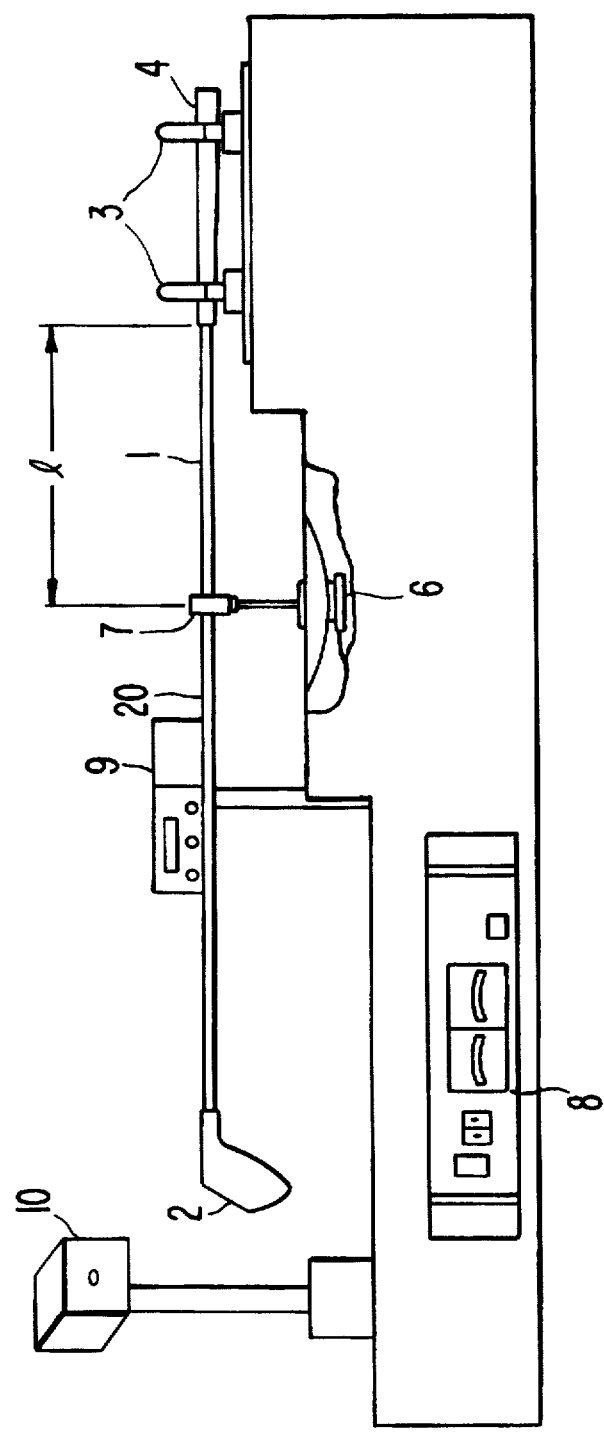

5,763,770

DESIGN OF GOLF CLUBS WITH NODE LINE MAPPING

This application is a continuation-in-part of U.S. patent application Ser. No. 08/578,167, Dec. 29, 1995, U.S. Pat. No. 5,703,294.

FIELD OF THE INVENTION

The invention relates to a method and a device for analyzing golf clubs, a method for making a vibrationally tuned club, and tuned golf clubs.

BACKGROUND OF THE INVENTION

The art of golfing involves a precise interplay between the golfer and the golf club. Unless planned, the desired shot includes consistent contact at the "sweet spot" of the club head. The shot feels good, strong, and smooth when hit with the sweet spot of the club head. In contrast, shots hit elsewhere may sting, twist, and just feel bad. Other clubs feel good sometimes, bad other shots. Unfortunately, perceptions can be difficult to reproduce and translate into reproducible, measurable physical characteristics.

Club heads have been designed with a variety of techniques. Most recently seen is the use of perimeter weighting to enlarge the sweet spot of the head. This aspect of the head is widely cited in marketing advertisements. Unfortunately, those advertisements only tell half the story and end up misleading potential purchasers because clubs are made of both a shaft and a head. Head design is certainly important, but the sweet spot designed into the head does not dictate the properties of the club. The properties of the shaft (e.g., flex, kick point, torsional strength and stiffness, length, hosel design, etc.) must be considered and their effects on the final club properties have been significantly harder to characterize.

To date, the art of matching shafts and heads has been made by an Edisonian trial-and-error technique. Standards and guidelines have proved elusive and, where they exist at all, a matter of broad qualitative suggestions. This lack of guidance has lead many club manufacturers to treat all shafts as equal and fungible. This leaves the purchasing decision for clubs to be based largely on reputation, word of mouth, and the effects of advertising hype.

The art is in need of an objective means for determining proper combinations of club head and shaft that provide a consistent, reproducible harmony between the shaft and the club head.

Vibrational analysis is a technique that has been widely used and studied for a variety of diverse mechanical phenomena. In a technique known as "modal analysis", complex structural motion is analyzed in terms of natural frequencies and mode shapes. Each natural frequency of a structure has a corresponding shape of vibration at that frequency ("mode shape"). Such shapes are additive so that any vibration can be represented in terms of the sum of individual natural frequencies and mode shapes.

Vibrational analysis is well suited for articles that are not readily investigated with other methods. It would be useful to have a device and test protocol for analyzing golf clubs and a method for tuning such clubs to optimize performance.

SUMMARY OF THE INVENTION

It is an objective of the invention to provide a device for analyzing golf clubs by vibrational analysis techniques.

It is another objective of the invention to describe a method for testing golf clubs to map the true sweet spot of the striking face.

A further objective of the invention is to provide a method for and products of tuning and adjusting golf clubs to exhibit a true sweet spot at optimal position for striking a golf ball.

In accordance with these and other objectives of the invention that will become apparent from the description herein, a device according to the invention includes:

a. a first clamp configured to hold the shaft securely at a distance between the grip and a first node line of the shaft while allowing the remaining club length to extend away from the clamp in a manner that does not inhibit vibrational motion of the shaft or head;

b. a vibrational electromagnetic exciter connected to the first clamp;

c. an amplifier electrically connected to the exciter;

d. a sinusoidal signal generator that generates a first signal and a second signal, the generator being electrically connected to the amplifier so that the first signal is amplified and causes the shaft to vibrate at a frequency corresponding to the first signal; and e. a flashing light source synchronized to illuminate the club head at a rate corresponding to the second signal from the generator.

A method for testing golf clubs by vibrational analysis that includes the steps of:

a. securing a golf club in a clamp at a position between the grip and a first node point of the shaft;

b. subjecting the club to vibrations of at least three frequencies corresponding to the club's first, second, and third resonant frequencies to cause said club head to vibrate around corresponding first, second, and third node lines; and c. mapping said first, second, and third node lines on the striking face of the club head.

A method for designing a tuned golf club includes the steps of:

a. securing said shaft in a clamp at a position between said grip and a first node point of said shaft;

b. subjecting said club to vibrations of at least three frequencies corresponding to first, second, and third resonant frequencies to cause said club head to vibrate around corresponding first, second, and third node lines; and c. mapping first, second, and third node lines corresponding to said resonant frequencies on the striking face of the club head; and d. replacing said first shaft with a second shaft to form a second club whose resonance properties cause a second node map of said second club to fall within acceptable limits of a desired node map.

Tuned clubs according to the invention are characterized by:

a. an elongated shaft having a tip end and a butt end;

b. a grip located at the butt end; and c. a club head attached to said tip end and having a generally planar surface with a geometric center adapted for striking a golf ball, wherein said club exhibits a vibrational resonance pattern in which first, second, and third node lines mapped onto said generally planar surface of said club head intersect and define a triangular area that falls completely within a radius of about 20 mm from the geometric center of said club head.

Analysis of golf clubs according to the invention reflects the performance and golfer perceptions of golf clubs in a reproducible, observable manner. Such a tool can be used by club manufacturers and designers to design better clubs with a consistent sweet spot. Golfers will benefit by a wider selection of clubs that are truly better and more consistent.

BRIEF DESCRIPTION OF THE DRAWINGS

FIG. 1 is a side view of the vibrational testing device.

DETAILED DESCRIPTION

Figure 2A:
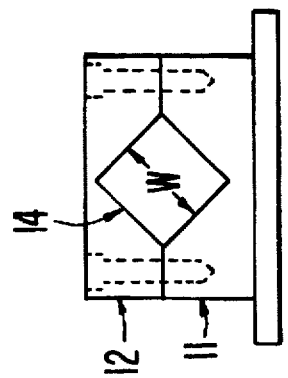
FIGS. 2a and 2b show a pair of butt grip clamps.

Making a tuned club involves the use of a vibration analyzer to map resonant node lines on the striking surface of the head, checking the resulting map against the desired impact area, and changing either the head or the shaft to produce a node line map that is closer to the desired impact area. Preferably, the first three node lines intersect to form a triangular area reflecting an impact area in which maximum energy is transmitted to the ball and little or no energy returned to the golfer as stinging vibrations that are perceived as a "bad" or improperly hit shot. Such vibrational analysis of the assembled club represents a reproducible, readily determined, functionally accurate picture of the performance of a particular combination of shaft and head. This technique represents a tool that takes the guesswork out of club design and makes the advertising hype subject to scientific analysis. Manufacturers and consumers alike have an objective method for comparing club performance.

Vibrational analysis according to the present invention can be applied to woods, irons, and putters with wood, steel, graphite or other composite shafts. The club heads can be made of metal, persimmon, composites (e.g., graphite, metal-ceramic, etc), or other materials. Particularly preferred combinations are graphite composite-based shafts combined with perimeter weighted irons or investment cast metal woods.

The node line map of the first three node lines represents a guide of the club's natural linear and torsional frequencies relative to the sweet spot designed in the club face. The combination of optimum performance and best "feel" occurs when the natural linear and torsional frequencies of the shaft and club head are selected to cause the first three node lines to intersect in a triangle at the geometric center of the club face. Such a cluster results in minimum excitation of those frequencies when the club strikes the ball and, therefore, a solid feeling. There is little or no vibrational energy left to provide a "bad" shot feel as well as an aggravating cause of the inflammation known as "golfer's elbow." See, Varoto et al., *Sound and Vibration*, pp. 20–23 (March 1995) the disclosure of which is herein incorporated by reference.

The first three nodes of a tuned club should intersect in a triangle that reflects the desired impact area of the club for shots that feel "good." This area is best and most accurately referred to as the "true sweet spot" of the club, a term that should not be confused with the "sweet spot" of the head: the club's sweet spot, if present, may have little or no relation to the sweet spot of the head due to the shaft's dynamic characteristics. In general, the triangular intersection area should be centered on or completely within a circle of a given radius that is centered on the geometric center of the club. Small triangular areas represent maximum energy transmission but with little leeway or "forgiveness" for off-center shots. Large triangular areas are forgiving but do not impart maximum energy transmission to the ball.

A preferred compromise of energy transmission and forgiveness is a node line map in which the triangular area is completely within a circle with a radius of about 20 mm centered on the geometric center of the club face. More preferably, the triangular intersection area falls within a circle having a radius of about 15 mm, even more preferably a radius of about 10 mm, and particularly a radius of about 8 mm out from the geometric center of the club head.

The vibration analyzer according to the present invention employs a frequency-adjustable sinusoidal generator attached to a shaft clamp and a synchronized, adjustable flashing light source (e.g., a strobe). An additional clamp or set of clamps are used to hold the grip end of the shaft in a rigid and immobile position. The remaining length of the club below the shaft clamp is allowed to extend freely and in a manner that does not inhibit its ability to vibrate naturally.

A variety of shaft clamp connections can be envisaged by those in the art that perform the function of transmitting vibrational energy from the generator to the shaft. A particularly preferred combination of generator and clamp is to attach a post and pair of concave clamps to the voice coil of a speaker or to the armature of any commercial vibration exciter. An additional clamp is used to hold the grip (butt end of the shaft) in a rigid, immobile position. All vibrational energy is thereby transmitted to the club length below the grip so that the vibrational characteristics of the club can be determined.

The shaft should be gripped by the shaft clamp at a point that is not a vibrational node point of the shaft. The first node point can be established by the empirical technique of impact testing. See, U.S. Pat. Nos. 4,870,868 and 4,979,743 (col. 5, lines 40–51). The gripping is usually up to about 50–52 cm from the butt end of a typical shaft. Because most grips are about 25–26 cm, the distance from the end of the grip can be used as a reference point rather than measurements from the butt of the shaft. In general, a distance of 1–25 cm, preferably 5–20 cm, and most preferably 5–12 cm from the tip end of the grip has proved to be applicable to a wide variety of clubs.

The generator vibrates the shaft and is adjusted to the natural frequencies of the club. Preferably, the generator can accurately produce a sinusoidal frequency within the range of about 10 cycles per second (cps) to about 1,000 cps corresponding to about 60–60,000 cycles per minute (cpm).

The flashing light source, such as a strobe, is initially synchronized to flash at the same frequency as the sinusoidal generator signal to determine the resonance frequency but is then adjusted to flash at a rate that is either slower or faster than the generator frequency to allow slow or stopped motion analysis of the club. For example, a flashing rate that is either 60 cpm higher or lower than the actual frequency, the club's vibration will appear in slow motion at 1 cps thereby allowing the viewer to observe the movements in slowed motion.

The distance between the flashing light source and the clamps should be sufficient to secure the shaft at a point of about 1–25 cm, preferably about 5–20 cm, and most preferably about 5–12 cm below a standard grip having a length of about 25 cm. Such positioning grips the club off the fist node point of the shaft and results in a vibrational analysis that will closely reflect the vibration transmission mechanism perceived by the golfer.

Figure 2B:
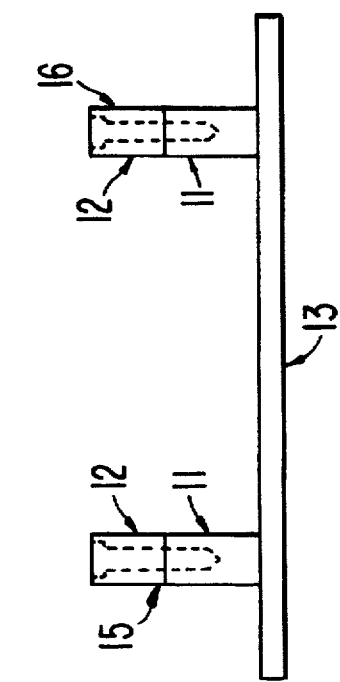

The present invention is conveniently described with reference to the attached figures in which the same structural elements are given the same reference number. Referring to FIGS. 1 and 2 (a,b), shaft 1 and club head 2 are rigidly clamped with a pair of immobile butt grips 3 pressing on hand grip 4. Club head 2 is mounted to present a horizontal leading edge of the striking face. This provides a consistent club orientation for the tests and allows illumination of the striking face regardless of the club type being analyzed.

Shaft 1 is held horizontally at a distance, 1, by first clamp 7 rigidly connected to electromagnetic exciter 6 (e.g., a the voice coil of a speaker). Distance 1 is selected to position clamp 7 between the tip end (i.e., toward the club head) of grip 4 and the first node point 20 on shaft 1. If desired, analyzers according to the invention can be made with an adjustable distance 1 to suit a wide variety of club lengths.

Second clamps 3 are conveniently made with lower half 11 rigidly connected to base plate 13. Upper half 12 mates with lower half 11 and can be rigidly fixed in position around grip 4 inserted through opening 14 having an opening width, w, and held in position with a fastener. Bolts (as shown), clips, pins or virtually any similar fastener, mechanical or otherwise, can be used to secure grip 4 in opening 14. Opening 14 in first clamp 15 may have the same width as second clamp 16 or a different width. Because most grips for woods and irons have a larger diameter at the butt end than at the tip end, it is expected that the clamp closer to the butt end will have an opening 14 that is a larger diameter.

Exciter 6 is electrically connected to power generator 8 (e.g., a stereo power amplifier) that amplifies a sinusoidal voltage signal of fixed amplitude and variable frequency that is generated by signal generator 9. The final amplitude of the force applied to shaft 1 is controlled by both the magnitude of the voltage signal from signal generator 9 and the voltage gain of amplifier 8. Preferably, signal generator 9 also produces a synchronization signal that can be used to trigger flashing light source 10 (e.g., a strobe light) at the same frequency shining down on the face of club head 2.

The synchronization between the light source and the exciting vibration makes it a simple matter of visual observation as frequency is adjusted to determine when the applied frequency matches a natural frequency and makes the club resonate. Resonance is seen when the club head begins to vibrate about a node line. The first node line is usually located on the striking face of the club head and is readily drawn on that surface. The second and third node lines are usually located at some distance below the striking face of the club head and can be projected onto the club's striking face. The area encompassed by these node lines (see, FIG. 3) is the true "sweet spot" of the club. Striking the ball within the bounded area will result in a solid shot with little or no vibrations.

Node lines are not evident when the club is not resonating. Resonance causes a 90 degree phase shift that is sensitive to changes in frequency. At frequencies other than resonating frequencies, the club head does not move about an axis and a line on the club face (drawn or inscribed as part of the head) is blurred. Only at resonant frequencies will the club head position stabilize under the strobe. Varying the frequency above or below the resonant frequency will cause the club head to shift position rapidly with even slight changes in frequency.

When analyzing a new club, the club is clamped horizontally into the unit so that the striking surface of the head is pointed up toward the strobe. The vibrating clamp should be position below the grip but above a node line on the shaft. The remainder of the club length is allowed to extend freely from the vibrating clamp in a manner that does not inhibit vibration of the club.

A line is drawn onto the club face or an existing line is marked to serve as a reference. The light source 10, conveniently described herein with reference to a strobe, is positioned to shine on the reference line and synchronized to the output of signal generator 9. The club is then subjected to vibrations over the range of 20–800 cps. The excitation frequency is slowly adjusted, usually increased, while monitoring the position of the reference line.

Initially, the reference line remains stationary as the frequency and vibration amplitude increase. The reference line will move to a new position relative to the excitation voltage wave form as resonance is approached. When resonance is achieved, a maximum vibration amplitude occurs as well as a 90 degree phase shift relative to the position below resonance. At frequencies significantly above the resonant frequency, the vibrational amplitude will decrease significantly reflecting a phase shift of nearly 180 degrees relative to the position below resonance.

The frequency is then slowly adjusted in the opposite direction, usually decreasing, until the reference line motion illuminated by the strobe light lies midway between the two extreme positions. The amplitude of the vibrations should be at a maximum. The range of frequencies for this variation is on the order of 1–2 percent of the natural frequency. With practice, the measurements can be repeated to within about 0.5%.

Once the natural frequency is established, the strobe is disconnected from synchronization with the signal generator. The flash rate is then adjusted to slow the motion of the vibrating club head, e.g., about 1–2 cps. Once slowed, the node line acting through the club head can be visually established and projected onto the surface of the club face. The same procedure is repeated at increasing frequencies to establish the first three natural frequencies for club head motion for both linear and angular resonances and generate a "map" of the true sweet spot for the club.

In a vibrating club under the slow motion view of a properly adjusted strobe, a node lines can be seen from the head movement as an axis about which the club head rotates. Because the first node line is on the striking surface, there is little difficulty in marking the axis of rotation with a pen or fine tape.

The second node is usually just below the strike surface, and the third node line is somewhat deeper within the head. These node lines must be "projected" onto the strike surface to determine the position and size of the club's true sweet spot. Projecting the axis is performed by observing the slowed motion rotation of the vibrating head and defining the line of least vibration by sensing the vibrating striking surface of the club head with the operator's finger. With patience, each of the three node lines at their respective resonant frequencies can be accurately mapped onto the striking surface of the club head.

Figure 9:
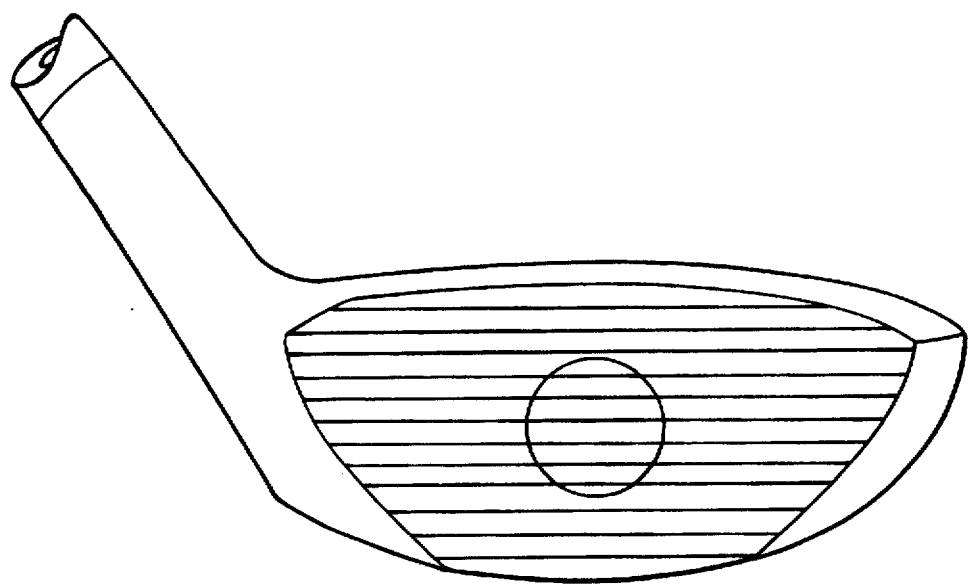
FIG. 9 illustrates a target area for a desired intersection of the 1st–3rd node lines.

Clubs that are vibrationally tuned according to the invention exhibit an intersection of the 1st–3rd node lines on the striking surface of the club head in a triangle that is roughly centered on the geometric center of the club and falls completely within a circle having a radius of about 20 mm, preferably about 15 mm, more preferably about 10 mm, and most preferably about 8 mm from the geometric center of the club face. See, FIG. 9. The use of a smaller radius (e.g., 6, 4, or even 2 mm) can be met with appropriate design of head and shaft characteristics although such small areas for the true sweet spot will decrease the "forgiveness" of the club. Such small areas may be suitable only for very experienced or professional golfers.

Figure 3:
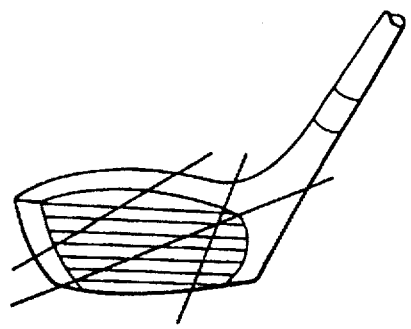
FIGS. 3–5 depict maps of node lines for clubs that do not have a true sweet spot (FIG. 3), a sweet spot located high on the club face (FIG. 4) and a proper sweet spot (FIG. 5).
Figure 4:
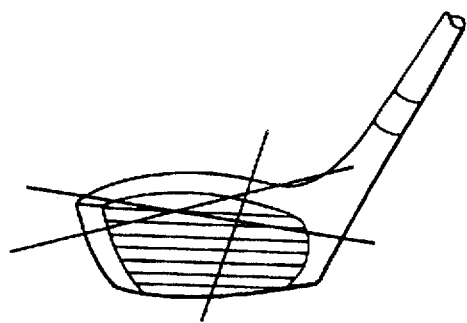
Figure 5:
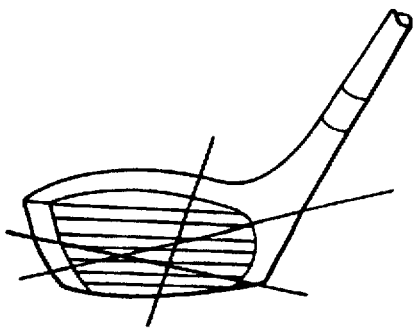
Figure 6:
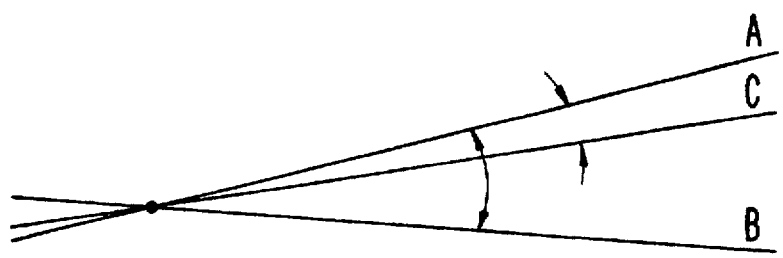
FIGS. 6–8 depict the appearance of a vibrating reference line at a frequency below resonance (FIG. 6), at resonance (FIG. 7), and above resonance (FIG. 8).
Figure 7:
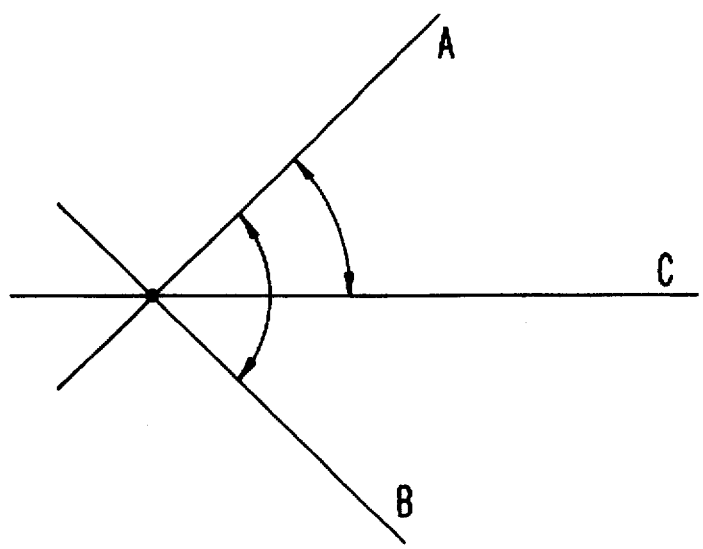
Figure 8:
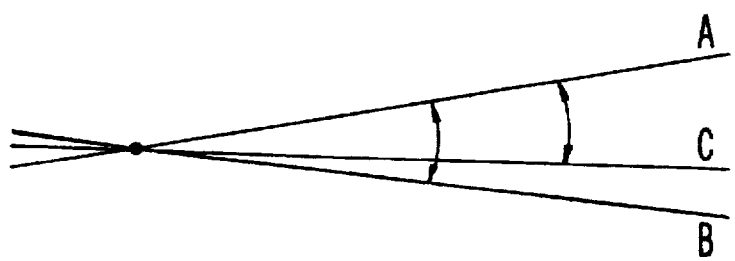

FIGS. 3-5 depict three types of node line maps. FIG. 3 illustrates a combination of club head and shaft that do not produce a true sweet spot. Such clubs are characterized by poor power transmission and a stinging sensation at the moment of impact with the ball.

FIG. 4 is a map of node lines that are partially out of harmony. Maximum power is achieved only on high, off center shots. Such feedback to the golfer is inconsistent with a proper shot thereby leading to a tendency to propagate or begin sub-optimal swing habits. Because the contours of a wood are typically designed for a lower point of impact, an off center shot of maximum power would tend to launch the ball higher than intended with a corresponding loss of distance.

FIG. 5 shows a node line map of a head and shaft that produce a true sweet spot at the club's face center, the location generally designed to be the intended point of impact. Maximum power is, therefore, delivered when the club is properly swung and contacted with the ball. Such feedback enforces proper technique and promotes better golf.

In the method of designing golf clubs according to the invention, a desired node map is established according to the desired club performance, the club's "forgiveness" towards off-center shots, the head designs available, and the shafts available. A first club is then made from the combination of a first head and a first shaft. The node lines are then mapped onto the striking surface of the club head and compared to the desired map.

Node line maps and the corresponding harmonization effects can be changed in a number of different ways. The head can be redesigned or have its weight distribution readjusted. Alternatively, the shaft can be replaced with one that has different characteristics, or the head can be replaced with one that is more suitable for the head. Which is selected will depend on numerous factors, including cost and availability, as well as the desired effects.

In general, there are too many variables at work between a head and a shaft to make meaningful generalizations about how to induce specific shifts in the node line map. Specific results and shifts in the node lines are dependent on interacting physical characteristics of the head and shaft that are too numerous to identify. Working with clubs that are all properly assembled, routine screening of heads and shafts in an orderly pattern are used to generate a chart of node lines and intersection patterns. Implicitly, the accuracy of such screening tests relies on the proven ability of modern shaft and head manufacturing techniques to produce product of consistent quality and properties.

For example, a standard head can be tested with a number of shafts to guide the club designer in selecting the combination of head and shaft that provide a node line intersection area within the desired area. In this method, a variety of shafts of known construction pattern, weight, and physical properties are all mapped using a first head of a given construction. The patterns and intersection areas are then compared to each other, to properties of the shafts, and to a desired node line intersection map. The same set of tests is then run with a second head of a given construction using the same series of shafts, and the results are compared to the first head as well as to the desired node line intersection map. The comparison will show a pattern for those shafts and type of heads that will permit shafts to be selected which results in the desired node line intersection area.

Similar tests can be performed using a given set of shafts for a variety of different head designs. A given group of shafts are assembled into clubs with first, second, third, etc. heads of different, identifiable construction. The node line patterns are then compared and correlated to head design. A pattern will be seen from such shaft screening and head screening tests that are used to guide club makers into selecting a combination of shaft and head that will produce an intersection area of node lines that are within a desired node map area.

We claim:

1. A method for designing golf clubs with steps including:
   a. mapping first, second, and third vibrational node lines onto a striking face of a first club head on a first club to form a first club node map, wherein said first club is made of a first shaft having a tip end and a butt end, a grip attached to said butt end, and a first club head attached to said tip end and said club;
   b. comparing said first club node map to a desired node map for determining whether said first node map is within acceptable limits of said desired node map; and
   c. replacing said first shaft with a second shaft to form a second club whose resonance properties cause a second node map of said second club to fall within acceptable limits of said desired node map.

2. A method as in claim 11 further comprising:
   mapping first, second, and third vibrational node lines of said second club onto a striking face of said first club head on said second club to form a second club node map; and
   comparing said second club node map to either or both of said first club node map and said second node map.

3. A method as in claim 2 wherein said second node map of said second club falls completely within a radius of about 20 mm from the geometric center of said first club head.

4. A method as in claim 2 wherein the second node map of said second club falls completely within a radius of about 15 mm from the geometric center of said first club head.

5. A method as in claim 2 wherein the second node map of said second club falls completely within a radius of about 10 mm from the geometric center of said first club head.

6. A method as in claim 2 wherein the second shaft is made of a graphite composite and second node map of said second club falls completely within a radius of about 10 mm from the geometric center of said first club head.

7. A method as in claim 2 wherein the second shaft is made of steel and the second node map of said second club falls completely within a radius of about 10 mm from the geometric center of said first club head.

* * * * *